United States Patent
Guo et al.

(10) Patent No.: US 9,303,108 B2
(45) Date of Patent: Apr. 5, 2016

(54) PROPYLENE RANDOM COPOLYMER, METHOD FOR ITS PREPARATION, AND COMPOSITIONS AND ARTICLES CONTAINING THE SAME

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORP, Beijing (CN)

(72) Inventors: Meifang Guo, Beijing (CN); Wenbo Song, Beijing (CN); Liying Zhang, Beijing (CN); Liping Hou, Beijing (CN); Wenjun Wei, Beijing (CN); Hao Zhang, Beijing (CN); Yujing Tang, Beijing (CN); Huijie Hu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 170 days.

(21) Appl. No.: 13/663,433

(22) Filed: Oct. 29, 2012

(65) Prior Publication Data

US 2013/0108814 A1    May 2, 2013

(30) Foreign Application Priority Data

Oct. 29, 2011  (CN) .......................... 2011 1 0335567
Oct. 29, 2011  (CN) .......................... 2011 1 0335576
Oct. 29, 2011  (CN) .......................... 2011 1 0336504
Oct. 29, 2011  (CN) .......................... 2011 1 0336505

(51) Int. Cl.
   *C08F 210/08*   (2006.01)
   *B32B 1/02*     (2006.01)
   *B32B 27/28*    (2006.01)
   *C08F 210/06*   (2006.01)
   *C08F 10/00*    (2006.01)

(52) U.S. Cl.
   CPC ............... *C08F 210/06* (2013.01); *C08F 10/00* (2013.01); *Y10T 428/1352* (2015.01)

(58) Field of Classification Search
   None
   See application file for complete search history.

(56) References Cited

U.S. PATENT DOCUMENTS

| 2002/0107351 A1 | 8/2002 | Tsuji et al. |
| 2005/0085609 A1 | 4/2005 | Appleyard et al. |
| 2005/0187367 A1 | 8/2005 | Hori et al. |

FOREIGN PATENT DOCUMENTS

| CN | 1138589 A | 12/1996 | |
| CN | 1159975 A | 9/1997 | |
| CN | 1258683 | 7/2000 | |
| CN | 1258683 A | 7/2000 | |
| CN | 102190748 A | 9/2011 | |
| WO | 95/14738 A1 | 6/1995 | |
| WO | WO 95/14738 | * 6/1995 | .............. C08L 23/16 |
| WO | 97/31954 A1 | 9/1997 | |
| WO | WO 97/31954 | 9/1997 | |
| WO | 2010/057841 A1 | 5/2010 | |
| WO | WO 2010/057841 | 5/2010 | |

OTHER PUBLICATIONS

Sacchi, M. C. et al. "Effect of internal and external Lewis bases on propene/ 1- butane copolymerization with MgCl2-supported Ziegler-natta catalytsts" Macromol. Chem., Rapid Commun., vol. 14, pp. 231-238 (1993).
"Effects of Internal and External Lewis Bases on Propene/1. \Butene Copolymerization with MgCl2-Supported Ziegler-Natta Catalysts" Makromolekulare Chemie, Rapid Communications, Huthig und Wepf Verlag Basel. CH. vol. 14, No. 4, Apr. 1, 1993 pp. 231-238.
European Extended Search Report for corresponding Application No. 12190341.3, mailed Jan. 16, 2013, 189 pgs.

* cited by examiner

*Primary Examiner* — Robert Harlan
(74) *Attorney, Agent, or Firm* — Novick, Kim & Lee, PLLC; Allen Xue

(57) ABSTRACT

The present invention relates to a propylene-butene-1 random copolymer which has a butene-1 content of 1-6 mol % and a relative dispersity of butene-1, as determined according to NMR method, of greater than 98.5%. The propylene-butene-1 random copolymer of the present invention has a high relative dispersity of butene-1, as well as better transparency and heat resistance, so that it is more suitable for packaging food that may be edible after heating. Moreover, the copolymer has a lower xylene solubles content at room temperature. In addition, the present invention further relates to a method for preparing the copolymer and to a composition and an article comprising the copolymer.

35 Claims, No Drawings

PROPYLENE RANDOM COPOLYMER, METHOD FOR ITS PREPARATION, AND COMPOSITIONS AND ARTICLES CONTAINING THE SAME

CROSS REFERENCE TO RELATED APPLICATIONS

This application claims priority to Chinese patent application No. 201110335567.0 filed on Oct. 29, 2011; Chinese patent application No. 201110335576.X filed on Oct. 29, 2011; Chinese patent application No. 201110336505.1 filed Oct. 29, 2011; and Chinese patent application No. 201110336504.7 filed Oct. 29, 2011, each of which is hereby incorporated by reference herein in its entirety.

TECHNICAL FIELD

The present invention relates to a propylene random copolymer, a method for its preparation, and compositions and articles containing the same, wherein the propylene random copolymer is particularly a propylene-butene-1 random copolymer.

BACKGROUND ART

Propylene random copolymer usually refers to a polymer obtained by randomly copolymerizing a small amount, usually not more than 15% by weight, of α-olefin monomer, for example, commonly used ethylene or butene-1, onto a polypropylene molecular chain. Since the co-monomers destroy the regularity of the arrangement of the propylene units in the molecular chain, the melting point and the degree of crystallinity of the polypropylene resin are declined. The relatively low melting point enables the polypropylene resin to be used for manufacturing a more readily heat-sealable film and the like, while the relatively low degree of crystallinity results in improved transparency of the material. Although co-monomers are often copolymerized in a larger amount in order to achieve higher transparency, the excessively increasing in the amount of co-monomers may unduly reduce the degree of crystallinity of the material, thereby reducing the rigidity and heat resistance of the material, and more important also increase the content of the non-crystalline components (the soluble contents) in the material, so that they tend to migrate onto the surface of articles and thus affect negatively the processing and application of the product. In particular, in case that the product is used for packaging greasy foods, a part of the non-crystalline components may gradually migrate to the food, and contaminate it. In addition, reducing the melting point and the degree of crystallinity usually also render heat resistance of the material deteriorated. If such a material is used in food containers, the deteriorated heat resistance makes it disadvantageous to the microwave heating. The use of co-monomers in a unduly larger amount may also bring difficulties to the polymerization process, for example, the occurrence of kettle-sticking, caking and hard removal of residual monomers, in particular when the co-monomer is butene-1 having higher boiling point or α-olefins having more carbon atoms.

In the prior art, butene-1 and propylene are often used to carry out random copolymerization, with the expectation that the resultant propylene-butene-1 random copolymer has a relatively low migrants content. However, the random copolymer still has drawbacks in giving consideration to both transparency and heat resistance. An existing solution is to combine with an appropriate amount of nucleating agent that can improve the transparency. Although this can, to some extent, improve the transparency and heat resistance of the copolymer material, the result is still not satisfactory in terms of the heat resistance and the migrants content.

DETAILED DESCRIPTION OF THE INVENTION

Therefore, one object of the present invention is to provide a propylene-butene-1 random copolymer, which is featured with good heat resistance and low xylene soluble content at room temperature, while maintaining or even further improving the excellent transparency.

By experiments, the present inventors have surprisingly found that, by increasing the relative dispersity of butene-1, the material can achieve at least the same transparency, but better heat resistance.

In the process of randomly copolymerizing butene-1 as a co-monomer with propylene, if a higher proportion of butene-1 monomers is inserted into the polypropylene molecular chain as discretely arranged monomer units, and a lower proportion of butene-1 monomers is inserted into the polypropylene molecular chain as consecutively arranged monomer units (such as BB dual units or more consecutive monomer units), the ratio of the observed dispersion coefficient $MD_{observed(B)}$ of butene-1 unit in the molecular chain to the ideal random dispersion coefficient $MD_{random(B)}$ will be greater. This ratio is defined as the relative dispersity $MD_{relative(B)}$ of butene-1, which is calculated according to the following equation:

$$MD_{observed(B)} = \frac{\frac{1}{2}[PB]}{[B]} \times 100 \tag{1}$$

$$MD_{random(B)} = (1-[B]) \times 100 \tag{2}$$

$$MD_{relative(B)} = \frac{MD_{observed(B)}}{MD_{random(B)}} \times 100 \tag{3}$$

Wherein, [PB] represents the number of butene-1 monomeric units linked to propylene monomeric units in the molecular chain; [B] represents the total number of butene-1 monomeric units in the molecular chain; and $MD_{observed(B)}$, $MD_{random(B)}$ and $MD_{relative(B)}$ are calculated in unit %.

Another object of the present invention is to provide a method for preparing propylene-butene-1 random copolymer. The method is capable of preparing propylene-butene-1 random copolymer with a very high relative dispersity of butene-1 and a low xylene soluble content at room temperature. Moreover, the polymerization process is easy to operate, and can avoid the occurrence of kettle-sticking, caking, hard removal of residual monomers and the like.

Still another object of the present invention is to provide a polypropylene composition, in particular a propylene-butene-1 random copolymer composition, which has high transparency, low migrants content and high heat resistance.

Still another object of the present invention is to provide a food packaging container, which has high transparency, low migrants content and high heat resistance.

In addition, the present invention also provides methods for preparing the polypropylene composition and the food packaging container as described above.

The propylene-butene-1 random copolymer in the present invention has a butene-1 content of 1-6 mol %, preferably 3-6 mol %, and has a relative dispersity of butene-1, as determined according to NMR method, of greater than 98.5%, preferably greater than 99.0%.

The butene-1 content in the propylene-butene-1 random copolymer may affect the degree of crystallinity of polypropylene. The higher the butene-1 content is, the lower the degree of crystallinity of polypropylene will be, and the better the transparency of the material will be. However, an excessively high butene-1 content may result in excessive xylene solubles at room temperature, while an excessively low butene-1 content may result in a excessively high degree of crystallinity which influences the transparency. By a large number of experiments, it has been found that the butene-1 content is preferably 1-6 mol %, more preferably 3-6 mol %.

As mentioned above, by increasing the relative dispersity of butene-1 in the propylene-butene-1 random copolymer, the material may have better heat resistance while achieving the same transparency. The relative dispersity of butene-1 in the propylene-butene-1 random copolymer of the present invention can be up to greater than 98.5%, preferably greater than 99.0%.

Due to a very high relative dispersity of butene-1, the propylene-butene-1 random copolymer of the present invention can have a heat distortion temperature up to above 90° C., preferably above 95° C.

The increase of the amount of co-monomer in propylene random copolymer may usually lead to the increase of the xylene solubles content at room temperature, and such a result applies also to butene-1 as a co-monomer. In general, a relatively high xylene solubles content at room temperature may result that the product as a packaging material is not allowed to be in direct contact with food, pharmaceutical and the like, or else, it may contaminate the packaged items. However, within the butene-1 content range in the propylene-butene-1 random copolymer as suggested in the present invention, the xylene solubles content at room temperature increases slowly as the butene-1 content increases.

In concrete, the xylene solubles content at room temperature (about 25° C.) in the propylene-butene-1 random copolymer of the present invention is lower than the following fitted line:

$$Y=0.77+0.252X$$

Wherein: Y is the weight percent of xylene solubles at room temperature (e.g. in case of 5 wt %, Y=5); X is the mole percent of butene-1 in the propylene-butene-1 random copolymer (e.g. in case of 5 mol %, X=5).

Due to the reduction in the xylene solubles content at room temperature, the propylene-butene-1 random copolymer of the present invention, when used for food packaging containers, has higher food safety; and, when used for film processing, it is not easy to stick rollers and makes the metal plating layer not so easy to be detached.

Usually, the processability of the polymer is controlled by controlling the melt index. Preferably, the propylene-butene-1 random copolymer of the present invention has a melt index, as measured at 230° C. under a load of 2.16 kg, of 0.5-50 g/10 min, preferably 2-30 g/10 min.

The propylene-butene-1 random copolymer of the present invention has a molecular weight distribution index Mw/Mn for characterizing the molecular weight distribution, as measured according to GPC, of 3.5-8, preferably 3.8-6. A too small molecular weight distribution index means that the molecular weight distribution is narrow, so that the processing performance of the material becomes poor; and a too large molecular weight distribution index means that the molecular weight distribution is wide, so that the transparency of the material may be affected and reduced.

The propylene-butene-1 random copolymer of the present invention having a high relative dispersity of butene-1 in combination with better transparency and heat resistance is very suitable for packaging food that may be edible after heating. Moreover, the copolymer has such a lower xylene solubles content at room temperature that, when used as packaging material, it can advantageously avoid the contamination of the packaged items from the precipitation of room temperature solubles, and may be more suitable for using as food and pharmaceutical packaging materials.

The method for preparing the propylene-butene-1 random copolymer of the present invention comprises: the copolymerization of propylene and butene-1 is carried out by adjusting the amount of the co-monomer butene-1 added in the reactor to obtain the propylene-butene-1 random copolymer in the presence of a selected Ziegler-Natta catalyst and at a polymerization temperature and an appropriate hydrogen content.

The selected Ziegler-Natta catalyst in the present invention refers to the catalysts as described in Chinese Patents CN85100997A, CN1258680A, CN1258683A, CN1258684A. The contents disclosed in the four documents are all incorporated herein as the technical solutions relating to the catalyst of the present invention and thus become a part of the present invention. The catalyst as described in Chinese patent CN1258683A particularly has advantages when used as the catalyst of the present invention, so the contents disclosed in this document are all incorporated herein as the preferred technical solution relating to the catalyst of the present invention.

In a specific embodiment, the propylene-butene-1 random copolymer is obtained by copolymerization with the use of a Ziegler-Natta catalyst comprising a main catalyst component A, a co-catalyst component B and an external electron donor component C, wherein the main catalyst component A is a solid catalyst component comprising titanium and a polybasic carboxylic acid ester obtained by dissolving magnesium halide in a solvent system composed of an organic epoxy compound, an organic phosphorus compound and an inert diluent;

the component B is an alkyl aluminum compound having the general formula $AlR_nX_{3-n}$, wherein R is hydrogen or a hydrocarbon group having 1 to 20 carbon atoms, X is halogen; and the component C is an organosilicon compound having the general formula $R_nSi(OR')_{4-n}$, where $0 \leq n \leq 3$, R and R' are the same or different alkyl groups, cycloalkyl groups, aryl groups or halogenated alkyl groups.

Preferably, in the solvent system as described above, based on per mole of the magnesium halide, the amount of the organic epoxy compound is 0.2-5 moles, and the mole ratio of the organic epoxy compound to the organic phosphorus compound is 0.9-1.6.

Preferably, the mole ratio of the component B to the component A, measured as the mole ratio of aluminum to titanium, is 5-1000, and the ratio of the component C to the component A, measured as the mole ratio of silicon to titanium, is 2-100.

The main catalyst component A may be, for example, obtained by dissolving magnesium halide in a solvent system composed of an organic epoxy compound, an organic phosphorus compound and an inert diluent to form a homogeneous solution, then mixing the solution with titanium tetrahalide or a derivative thereof to precipitate a solid in the presence of a precipitating agent, treating the solid with a polybasic carboxylic acid ester to make it loaded on the solid, and then treating the solid with titanium tetrahalide and an inert diluent, wherein the precipitating agent is one selected from an organic acid anhydride, an organic acid, an ether and a ketone.

The further preferred Ziegler-Natta catalyst in the present invention is characterized in that it comprises a main catalyst component A, a co-catalyst component B and an external electron donor component C,
wherein the component A is a solid catalyst component comprising titanium, obtained by dissolving magnesium halide in a solvent system composed of an organic epoxy compound, an organic phosphorus compound and an inert diluent to form a homogeneous solution, mixing the solution with titanium tetrahalide or a derivative thereof to precipitate a solid in the presence of a precipitating agent, treating the solid with a polybasic carboxylic acid ester to make it loaded on the solid, and then treating the solid with titanium tetrahalide and an inert diluent, wherein the precipitating agent is one selected from an organic acid anhydride, an organic acid, an ether and a ketone and in the solvent system as described above, based on per mole of the magnesium halide, the amount of the organic epoxy compound is 0.2-5 moles, and the mole ratio of the organic epoxy compound to the organic phosphorus compound is 0.5-1.6;
the component B is an alkyl aluminum compound having the general formula $AlR_nX_{3-n}$, where R is hydrogen or a hydrocarbon group having 1 to 20 carbon atoms, X is halogen; and the component C is an organosilicon compound having the general formula $R_nSi(OR')_{4-n}$, where $0 \leq n \leq 3$, R and R' are the same or different alkyl groups, cycloalkyl groups, aryl groups or halogenated alkyl groups;
the mole ratio of the component B to the component A, measured as the mole ratio of aluminum to titanium, is 5-1000, and the ratio of the component C to the component A, measured as the mole ratio of silicon to titanium, is 2-100.

The magnesium halide in the above catalyst component A includes magnesium dihalide, complexes of magnesium dihalide with water, alcohol and the like, and derivatives obtained by replacing one halogen atom in the molecular formula of magnesium dihalide with hydrocarbon group or halohydrocarbyloxy group. With respect to the magnesium dihalide as mentioned above, it can be magnesium dichloride, magnesium dibromide and magnesium diiodide.

The organic epoxy compound in the above catalyst component A includes aliphatic olefins having 2 to 8 carbon atoms, diolefins or halogenated aliphatic olefins or oxides of diolefins, glycidyl ethers, inner ethers and the like. As the concrete examples for the above list, the useful compound can be selected from ethylene oxide, propylene oxide, butylene oxide, butadiene oxide, butadiene dioxide, epichlorohydrin, methyl glycidyl ether, diglycidyl ether, tetrahydrofuran.

The organic phosphorus compound in the above catalyst component A includes hydrocarbyl esters or halogenated hydrocarbyl esters of ortho-phosphoric acid or phosphorous acid. In concrete, such a compound can be, for example, trimethyl ortho-phosphate, triethyl ortho-phosphate, tributyl ortho-phosphate, triphenyl ortho-phosphate, trimethyl phosphite, triethyl phosphite, tributyl phosphite, benzyl phosphite.

The inert diluent in the above catalyst component A may include hexane, heptane, octane, benzene, toluene, xylene, 1,2-dichloroethane, chlorobenzene and other hydrocarbon or halogenated hydrocarbon compounds.

The magnesium halide solution in the above catalyst component A has the following composition: based on per mole of magnesium halide, the amount of the organic epoxy compound is 0.2-5 moles, preferably 0.5-2 moles; the mole ratio of the organic epoxy compound to the organic phosphorus compound is 0.5-1.6, preferably 0.9-1.6, most preferably 0.9-1.4; and the amount of the inert diluent is 1200-2400 ml, preferably 1400-2000 ml.

The halide of transition metal Ti or its derivative in the above catalyst component A is represented by the general formula $TiX_n(OR)_{4-n}$, where n=1-4. In concrete, the examples of such compounds may be titanium tetrachloride, titanium tetrabromide, titanium tetraiodide, tetrabutoxy titanium, tetraethoxy titanium, monochloro triethoxy titanium, dichloro diethoxy titanium, and trichloro monoethoxy titanium. The amount of the halide of transition metal Ti or its derivative is 0.5-150 moles, preferably 1-20 moles, per mole of magnesium halide.

The precipitating agent in the above catalyst component A is selected from the group consisting of organic acids, organic acid anhydrides, organic ethers, organic ketones, or mixtures thereof. As examples for the above list, the precipitating agent can be selected from acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, methyl ether, ethyl ether, propyl ether, butyl ether, amyl ether. The amount of the precipitating agent is 0.03-1.0 moles, preferably 0.05-0.4 moles, per mole of magnesium halide.

The polybasic carboxylic acid ester in the above catalyst component A is selected from the group consisting of aliphatic polybasic carboxylic acid esters and aromatic polybasic carboxylic acid esters, or mixtures thereof. For example, the polybasic carboxylic acid ester can be selected from diethyl malonate, dibutyl malonate, diethyl adipate, dibutyl adipate, diethyl sebacate, dibutyl sebacate, diisobutyl phthalate, di-n-butyl phthalate, diisooctyl phthalate, diethyl maleate, di-n-butyl maleate, diethyl naphthalene dicarboxylate, dibutyl naphthalene dicarboxylate, triethyl trimellitate, tributyl trimellitate, triethyl hemimellitate, tributyl hemimellitate, tetraethyl pyromellitate, tetrabutyl pyromellitate. The amount of the polybasic carboxylic acid ester is 0.0019-0.01 moles, preferably 0.0040-0.0070 moles, per mole of magnesium halide.

The organic aluminum compound in the above catalyst component B is represented by the general formula $AlR_nX_{3-n}$, wherein R is hydrogen, a hydrocarbon group having 1 to 20 carbon atoms, particularly alkyl, aralkyl, aryl group; X is halogen, particularly chlorine and bromine; n is $0 < n \leq 3$. In concrete, the compound can be selected from for example, trimethyl aluminum, triethyl aluminum, triisobutyl aluminum, trioctyl aluminum, diethyl aluminum hydride, diisobutyl aluminum hydride, diethyl aluminum chloride, diisobutyl aluminum chloride, sesquiethyl aluminum chloride, and ethyl aluminum dichloride, among which triethyl aluminum and triisobutyl aluminum are preferred.

The organic silicon compound in the above catalyst component C is represented by the general formula $R_nSi(OR')_{4-n}$, wherein $0 \leq n \leq 3$, R and R' are the same or different alkyl, cycloalkyl, aryl or halogenated alkyl groups. In concrete, the compound can be selected from, for example, trimethyl methoxysilane, trimethyl ethoxysilane, dimethyl dimethoxysilane, dimethyl diethoxysilane, methyl cyclohexyl dimethoxysilane, dibutyl dimethoxysilane, diphenyl dimethoxysilane, diphenyl diethoxy silane, phenyl trimethoxysilane and vinyl trimethoxysilane.

In the above catalyst system, the mole ratio of aluminum in the component B to titanium in the component A is 5-1000, preferably 25-300; the mole ratio of silicon in the component C to titanium in the component A is 2-100, preferably 8-32.

The method for preparing the above catalyst component A comprises the following steps:

1. Magnesium halide is dissolved with stirring in a solvent system composed of an organic epoxy compound, an organic phosphorus compound and an inert diluent at a temperature of 0-100° C., preferably 30-70° C., to form a transparent homogeneous solution;
2. In the presence of a precipitating agent and at a temperature of −35-60° C., preferably −30-5° C., a titanium compound is added to the magnesium halide solution or the magnesium halide solution is added to a titanium compound, and moreover, a polybasic carboxylic acid ester needs to be added before or after the precipitation of a solid to thereby treat the precipitated solid and make the polybasic carboxylic acid ester partially loaded on the solid;
3. The reaction mixture is heated to a temperature of 60-110° C., and the suspension is stirred at this temperature for 10 minutes to 10 hours;
4. After end of the stirring, the solid is precipitated from the mixture solution, followed by filtering, removing mother liquor, and washing the solid with toluene and hexane, to obtain the solid catalyst component A comprising titanium.

The three catalyst components may be added to the polymerization reactor directly, or may be added to the reactor after being subjected to pre-complexation and/or prepolymerization. The reactor for pre-complexation reaction may be in various forms. For example, it may be a continuous stirred tank reactor, a loop reactor, a section of pipe containing static mixer, or even a section of pipe in which the material is in a turbulent state.

The inventors have unexpectedly found that, by subjecting the selected catalyst of the present invention to a pre-complexation treatment, it is possible to obtain a propylene-butene-1 random copolymer having both a high relative dispersity of butene-1 and a low xylene solubles content at room temperature. The pre-complexation temperature can be controlled in the range of −10-60° C., preferably in the range of 0-30° C. The inventors have further found that, the relative dispersity of butene-1 in the propylene-butene-1 random copolymer of the present invention increases as the pre-complexation time prolongs, while the xylene solubles content at room temperature decreases as the pre-complexation time prolongs. However, a too long pre-complexation time will affect negatively the activity of the catalyst. Therefore, the pre-complexation time as selected in the present invention is 0.1-100 min, preferably 1-30 min.

The pre-complexed catalyst can also be optionally further subjected to prepolymerization. The prepolymerization can be carried out continuously under bulk liquid phase conditions, and can also be carried out intermittently in an inert solvent. The prepolymerisation reactor may be a continuous stirred tank, a loop reactor and the like. The prepolymerization temperature can be controlled in the range of −10-60° C., preferably in the range of 0-40° C. The multiple of prepolymerization is controlled to be 0.5 to 1000 times, preferably 1.0 to 500 times.

The polymerization reaction is carried out in a propylene liquid phase. When carrying out the liquid phase polymerization, the polymerization temperature is 0-150° C., preferably 40-100° C.; the polymerization pressure should be higher than the saturated vapor pressure of propylene at the corresponding polymerization temperature.

The polymerization can be carried out continuously, and can also be carried out intermittently. The continuous polymerization can be carried out in one or more liquid phase reactors connected in series. The liquid phase reactor can be a loop reactor, or a continuous stirred tank reactor.

Furthermore, the polymerization can also be carried out in gas phase. In this case, some suitable devices like a gas phase reactor can be employed.

The propylene-butene-1 random copolymer of the present invention can be subjected to extrusion granulation by using corresponding equipments. In the case of granulation, if required, other additives as generally used in this field, for example, antioxidants (e.g. 1010, 168), acid absorption agent (e.g. calcium stearate), light stabilizers, heat stabilizers, coloring agents, or nucleating agents capable of modifying optical properties, can be added. All of these additives can be added in their conventional amounts. During the granulation, the temperature of melt blending of materials is the one usually adopted in the processing of propylene polymer as blending temperature, which should be selected from the temperature range wherein the propylene polymer matrix can be totally molten but not decomposed, for example 180-260° C.

In a preferred embodiment, in order to prepare the preferred propylene-butene-1 random copolymer composition of the present invention, a nucleating agent can be added to polypropylene, which can reduce the size of crystal particles of polypropylene, improve the optical properties of the material, and further improve the heat resistance of the material. Preferably, the nucleating agent is Millad 3988 (manufactured by Milliken Chemical Co.), ADK NA-21 (manufactured by Asahi Denka Corp.) and Millad NX8000 (manufactured by Milliken Chemical Corp.). The most preferable nucleating agent is Millad 3988. The nucleating agent can be added in the stage of granulation. The amount of the nucleating agent is 0.1-1 parts by weight, preferably 0.2-0.4 parts by weight. The method for preparing the composition comprises melt blending the propylene-butene-1 random copolymer powder with the preferred Millad 3988 nucleating agent and optionally other additives according to the above mentioned weight ratio.

The composition of the present invention also has the following technical features: a haze of the sheet (with a thickness of 1 mm) formed by melt injection molding of less than 10%, preferably less than 8%; and a heat distortion temperature of greater than 95° C., preferably greater than 100° C., more preferably greater than 105° C. The composition of the present invention has better transparency and heat resistance, and it is more suitable for packaging food that may be edible after heating. Moreover, the composition has also a lower migrants content, so that, when used as packaging material, it can advantageously avoid the contamination of the packaged items from the precipitation of migrants, and it is especially for use as food and pharmaceutical packaging materials.

The present invention further provides a food packaging container, which is formed by the polypropylene copolymer of the present invention or the polypropylene copolymer composition as above described. The method for preparing the container comprises: melting the particles of the polypropylene composition and forming by using any molding process. The molding process may be injection molding, thermoforming, blow molding and the like. The packaging container of the present invention is suitable for packaging liquid or solid food, particularly greasy food.

EXAMPLES

The present invention is further described by illustrating the following examples. The scope of the present invention is not limited to these examples. The scope of the present invention is defined in the claims.

The relevant data in the present invention and its examples are obtained according to the following measurement methods:

1. The measurement of the content and relative dispersity ($MD_{relative(B)}$, relative monomer dispersity) of the co-monomer butene-1 in the propylene-butene-1 random copolymer:

The measurement is conducted by using AVANCE III type 400 MHz nuclear magnetic resonance spectroscopy (NMR), manufactured by Bruker Co. (Switzerland), under the following conditions and parameters: deuterated o-dichlorobenzene as solvent, 250 mg sample/2.5 ml solvent, dissolving sample at 140° C., collecting $^{13}C$-NMR, detection temperature 125° C., detection head 10 mm, delay time D1 being 10 seconds, sampling time AT being 5 seconds, scanning times >5000 times. The operation of experiments, the identification of spectrum peaks and the data processing are conducted in accordance with the norms of standard NMR. With respect to more detailed contents, please refer to the following documents: (1) H. N. Cheng, $^{13}C$ NMR Analysis of Propylene-Butylene Copolymers by a Reaction Probability Model, Journal of Polymer Science: Polymer Physics Edition, 21, 573-581 (1983). (2) Eric T. Hsieh, and James C. Randall, Monomer Sequence Distributions in Ethylene-1-Hexene Copolymers, Macromolecules, 15, 1402-1406 (1982).

The relative dispersity ($MD_{relative(B)}$) of butene (B) is calculated according to the following equation:

$$MD_{observed(B)} = \frac{\frac{1}{2}[PB]}{[B]} \times 100 \quad (1)$$

$$MD_{random(B)} = (1-[B]) \times 100 \quad (2)$$

$$MD_{relative(B)} = \frac{MD_{observed(B)}}{MD_{random(B)}} \times 100 \quad (3)$$

Wherein, [PB] represents the number of butene-1 monomeric units linked to propylene monomeric units in the molecular chain; [B] represents the total number of butene-1 monomeric units in the molecular chain; $MD_{observed(B)}$ is the dispersion coefficient of butene-1 monomers in the molecular chain, $MD_{random(B)}$ is the ideal random dispersion coefficient, $MD_{relative(B)}$ is the relative dispersity of butene-1; and $MD_{observed(B)}$, $MD_{random(B)}$ and $MD_{relative(B)}$ are calculated in unit %.

2. The xylene solubles content: measured according to ASTM D5492-98.

3. Melt index (MFR): measured according to ISO1133, at 230° C., under a load of 2.16 kg.

4. Molecular weight distribution index Mw/Mn: molecular weight distribution of sample is measured by using PL-GPC 220 gel permeation chromatographic analyzer (manufactured by Polymer Laboratories Co., British) in combination with IRS detector (manufactured by Polychar Corp., Spain) under the following conditions and parameters: chromatographic columns—three Plgel 10 μm MIXED-B columns connected in series, solvent and mobile phase—1,2,4-trichlorobenzene (containing 0.3 g/1000 ml antioxidant 2,6-di-butyl p-cresol), column temperature 150° C., flow rate of 1.0 ml/min, EasiCal PS-1 narrow distribution polystyrene standard sample (manufactured by PL Co.) useful for universal calibration.

5. Heat distortion temperature (HDT): measured according to ASTM D648.

6. Haze: measured according to ASTM D1003.

7. n-Hexane extract: measured according to GB/T5009.58

The above measurements are all carried out under room temperature conditions, unless otherwise indicated.

Example 1

The polymerization reaction was carried out in a pilot plant. The main equipment includes a pre-complexation reactor, a prepolymerization reactor, a loop reactor. The polymerization method and steps were as follows:

(1) Pre-Complexation Reaction:

The main catalyst (an active solid catalyst component comprising titanium) was obtained by using the method described in Example 1 of Chinese patent CN1258683A, wherein the internal electron donor compound was diisobutyl phthalate. The obtained main catalyst contained 1.93 wt % of Ti, 19.8 wt % of magnesium, and 9.3 wt % of diisobutyl phthalate.

The main catalyst, co-catalyst (triethylaluminum) and external electron donor (methyl cyclohexyl dimethoxysilane) were fed respectively via different pipes to a jacketed continuous stirred tank for carrying out pre-complexation reaction. The pre-complexation temperature was controlled through the jacketed water to be 8° C., and the various reaction media were charged from the bottom, and discharged via overflow. Hexane was used to dilute the cocatalyst and the external electron donor thereby controlling the volume flow of these two materials, and further controlling the residence time in the pre-complexation reactor to be 1 minute.

(2) Prepolymerization Reaction:

The pre-complexed catalyst, entrained in propylene cooled to 10° C., was fed continuously to a prepolymerization reactor for carrying out prepolymerization. The prepolymerization reactor was a continuous stirred tank operated at full load. The prepolymerization was carried out in bulk liquid phase of propylene (the prepolymerization temperature and time were shown in Table 1). Under these conditions, the prepolymerized multiple of the catalyst was about 80 to 120 times.

(3) Copolymerization of Propylene-Butene-1:

The prepolymerized catalyst was fed to a loop reactor, wherein the copolymerization of propylene-butene-1 was accomplished. The polymerization reaction temperature was 70° C., and the reaction pressure was 4.0 MPa.

The amounts of butene-1 and hydrogen added in the loop reactor were shown in Table 1.

The polymer discharged from the loop reactor was subjected to a flash evaporation to separate propylene, and then passed through wet nitrogen to eliminate the activity of unreacted catalyst, followed by drying with heating. Finally polymer powders were obtained.

To 100 parts by weight of the obtained polymer powder, 0.1 parts by weight of IRGAFOS 168 additive (Ciba Specialty Chemicals), 0.2 parts by weight of IRGANOX 1010 additive (Ciba Specialty Chemicals) and 0.05 parts by weight of calcium stearate (Ciba Specialty Chemicals) were added respectively, and then granulated with a twin screw extruder to obtain pellets of the propylene-butene-1 random copolymer. The performance of the copolymer was tested and shown in Table 1.

Example 2

The procedures were the same as Example 1, except that the pre-complexation time of the catalyst was changed. The polymerization conditions and the performance of the polymer were shown in Table 1.

Example 3

The procedures were the same as those in Example 1, except that the amount of butene-1, the amount of hydrogen and the pre-complexation time of the catalyst were changed. The polymerization conditions and the performance of the polymer were shown in Table 1.

Example 4

The procedures were the same as those in Example 1, except that the amount of butene-1 and the pre-complexation time of the catalyst were changed. The polymerization conditions and the performance of the polymer were shown in Table 1.

Comparative Example 1

The procedures were the same as those in Example 1, except that the catalyst was not subjected to pre-complexation. The main catalyst, co-catalyst (triethylaluminum) and external electron donor (methyl cyclohexyl dimethoxysilane) were fed separately to a prepolymerization reactor directly. The polymerization conditions and the performance of the polymer were shown in Table 1.

Comparative Example 2

The procedures were the same as those in Example 4, except that the catalyst was not subjected to pre-complexation. The main catalyst, co-catalyst (triethylaluminum) and external electron donor (methyl cyclohexyl dimethoxysilane) were fed separately to a prepolymerization reactor directly. The polymerization conditions and the performance of the polymer were shown in Table 1.

Comparative Example 3

The main catalyst (the solid active center component comprising titanium) was obtained by using the method described in Example 1 of Chinese patent CN200410062291.3 (including the content "Preparation of Particles of Magnesium Chloride/Alcohol Adduct" in Example 1 and "General Procedure for Preparing a Spheric Catalyst Component" before Example 1), wherein the internal electron donor compound was di-n-butyl phthalate. The obtained main catalyst contained 2.4 wt % of Ti, 18.0 wt % of magnesium, and 13 wt % of di-n-butyl phthalate.

Other operations were the same as those in Example 4. The polymerization conditions and the performance of the polymer were shown in Table 1.

TABLE 1

Polymerization conditions and performance of polymers

| | Example 1 | Example 2 | Example 3 | Example 4 | Comparative example 1 | Comparative example 2 | Comparative example 3 |
|---|---|---|---|---|---|---|---|
| Catalyst: Al/Ti, mol/mol | 83 | 83 | 83 | 83 | 83 | 83 | 83 |
| Catalyst: Al/propylene, g/kg | 0.2 | 0.2 | 0.2 | 0.2 | 0.2 | 0.2 | 0.2 |
| Catalyst: Al/Si, m/m (mass ratio) | 10 | 10 | 10 | 10 | 10 | 10 | 10 |
| Pre-complexation time, min | 1 | 10 | 15 | 20 | 0 | 0 | 20 |
| Prepolymerization temperature, °C. | 10 | 10 | 10 | 10 | 10 | 10 | 10 |
| Prepolymerization time, min | 4 | 4 | 4 | 4 | 4 | 4 | 4 |
| Amount of butene-1, ppmv | 120100 | 120100 | 135000 | 196000 | 120100 | 196000 | 196000 |
| Amount of $H_2$, ppmv | 1510 | 1510 | 800 | 1510 | 1510 | 1510 | 1510 |
| Content of butene-1, mol % | 3.4 | 3.4 | 3.7 | 5.5 | 3.4 | 5.5 | 5.5 |
| Relative dispersity of butene-1, % | 99.1 | 99.6 | 99.6 | 99.6 | 98.2 | 98.0 | 98.1 |
| Xylene solubles content, wt % | 1.54 | 1.30 | 1.30 | 1.8 | 2.8 | 3.2 | 3.5 |
| Mw/Mn | 3.9 | 3.9 | 4.5 | 4.0 | 3.9 | 4.0 | 5.0 |
| Melt index, g/10 min | 9.3 | 9.2 | 4 | 9.2 | 9.2 | 9.3 | 9.3 |
| Heat distortion temperature, °C. | 95 | 98 | 97 | 92 | 88 | 85 | 84 |
| Haze, % | 42 | 42 | 41 | 38 | 42 | 38 | 38 |

Notes:
"Al/Si, m/m (mass ratio)" in Table 1 refers to the mass ratio of triethylaluminum to methyl cyclohexyl dimethoxysilane.

As could be seen from the above data, with respect to the selected catalyst of the present invention, the propylene-butene-1 random copolymer resulted by using the catalyst that had been subjected to pre-complexation treatment had a significant increase in the relative dispersity of butene-1 and a significant decrease in the xylene solubles content at room temperature, in comparison with the propylene-butene-1 random copolymer resulted by using the catalyst that had not been subjected to pre-complexation treatment. In the case of the same butene content, the copolymer had a similar transparency, but an increased heat distortion temperature. This demonstrated that the heat resistance of the material was improved. Moreover, as the pre-complexation time prolonged, the above effects could be further improved. As could be seen from the data of Comparative Example 3 and Example 4, the pre-complexation imposed a significant impact on the obtained performance of the selected catalyst of the present invention, that is to say, the selected catalyst of the present invention and the pre-complexation produced a synergistic effect.

Example 5

A Composition of the Present Invention

The procedures of examples 1 to 4 and comparative examples 1 to 3 were repeated with the exception that 0.3 part by weight of nucleating agent Millad 3988 (Milliken Chemical Company, Ltd.), 0.1 parts by weight of IRGAFOS 168 additive (Ciba Specialty Chemicals), 0.2 parts by weight of IRGANOX 1010 additive (Ciba Specialty Chemicals) and 0.05 parts by weight of calcium stearate (Ciba Specialty Chemicals) were added respectively into each 100 parts by weight of the obtained polymer powders and then granulated by two-screw extruder, thereby obtaining the pellets of the compositions 1 to 4 (Comp. 1-4) and comparative compositions 1 to 3 (Comparative Comp. 1-3). The performances of the compositions were shown in Table 2.

TABLE 2

Overview of performances of compositions

| | Comp. 1 | Comp. 2 | Comp. 3 | Comp. 4 | Comparative Comp. 1 | Comparative Comp. 2 | Comparative Comp. 3 |
|---|---|---|---|---|---|---|---|
| Heat distortion temperature, ° C. | 101 | 106 | 106 | 98 | 93 | 88 | 86 |
| Haze, % | 7.6 | 7.5 | 7.4 | 6.0 | 7.7 | 6.2 | 6.2 |
| n-Hexane extract, g/100 g | 0.8 | 0.7 | 0.7 | 1.0 | 1.1 | 1.3 | 1.4 |

As could be seen from Table 2, the composition prepared from the propylene-butene-1 random copolymer having a higher relative dispersity of butene-1 and a lower xylene solubles content after the addition of a nucleating agent had better transparency and heat resistance and lower migrants content.

Example 6

Food Packaging Container of the Present Invention

The food packaging container of the present invention was produced by an injection moulding process. In this process, the pellets of composition 1 as prepared in Example 5 were dried in a thermostatic oven at temperature of 90° C. for 4 hours. The materials were turned into a molten state in cylinder of the injection machine by the homogeneous heating. Under a certain pressure and injection rate, a defined amount of molten materials were injected into the mold cavity, subjected to a pressure keeping stage and then cooled to be solidified to a shaped article. During the whole injection moulding process the following parameters and conditions were adopted: the temperature of injection machine being 190° C.-220° C., the injection pressure being 50~60 MPa, dwell pressure being 50~60 MPa, dwell time being 30~40 seconds, cooling time being 15~20 seconds and the mold temperature being 35~45° C.

What is claimed is:

1. A propylene-butene-1 random copolymer, having a butene-1 content of 1-6 mol %, a relative dispersity of butene-1, as determined according to NMR method, of greater than 99.0%, and a molecular weight distribution index Mw/Mn, as measured according to GPC, of 3.8-6,
    wherein the copolymer has a xylene solubles content at room temperature that is lower than Y %,
    wherein Y equals 0.77+0.252X, and X ranges from 1-6, corresponding to a mole percent of butene-1 in the copolymer,
    wherein the copolymer is obtained by copolymerization using a Ziegler-Natta catalyst comprising:
    a main catalyst component A,
    a co-catalyst component B, and
    an external electron donor component C,
    wherein the component A is a solid catalyst component comprising titanium and a polybasic carboxylic acid ester obtained by dissolving magnesium halide in a solvent system comprising an organic epoxy compound, an organic phosphorus compound and an inert diluent;
    the component B is an alkyl aluminum compound of general formula $AlR_nX_{3-n}$, wherein R is hydrogen or a hydrocarbon group having 1 to 20 carbon atoms, X is halogen; and
    the component C is an organosilicon compound of general formula $R_nSi(OR')_{4-n}$, where $0 \leq n \leq 3$, R and R' are independently selected from the group consisting of talkyl groups, cycloalkyl groups, aryl groups, and halogenated alkyl groups,
    wherein the components A, B and C are subjected to pre-complexation.

2. The propylene-butene-1 random copolymer of claim 1, characterized in that the butene-1 content is 3-6 mol %.

3. The propylene-butene-1 random copolymer in of claim 1, characterized in that the relative dispersity of butene-1, as determined according to NMR method, is greater than 99.0%.

4. The propylene-butene-1 random copolymer of claim 1, having a melt index, as measured at 230° C. under a load of 2.16 kg, of 0.5-50 g/10 min.

5. The propylene-butene-1 random copolymer of claim 1, having a melt index, as measured at 230° C. under a load of 2.16 kg, of 2-30 g/10 min.

6. The propylene-butene-1 random copolymer of claim 1, characterized in that, in the solvent system, based on per mole of the magnesium halide, an amount of the organic epoxy compound is 0.2-5 moles, and a mole ratio of the organic epoxy compound to the organic phosphorus compound is 0.9-1.6.

7. The propylene-butene-1 random copolymer of claim 1, characterized in that, a mole ratio of the component B to the component A, measured as the mole ratio of aluminum to titanium, is 5-1000, and a mole ratio of the component C to the component A, measured as the mole ratio of silicon to titanium, is 2-100.

8. The propylene-butene-1 random copolymer of claim 1, characterized in that the component A is obtained by:
    dissolving magnesium halide in a solvent system composed of an organic epoxy compound, an organic phosphorus compound and an inert diluent to form a homogeneous solution, mixing the solution with titanium halide or a derivative thereof to precipitate a solid in the presence of a precipitating agent,
loading a polybasic carboxylic acid ester onto the solid, and
then treating the solid with titanium tetrahalide and an inert diluent, wherein the precipitating agent is one selected from the group consisting of an organic acid anhydride, an organic acid, an ether and a ketone.

9. The propylene-butene-1 random copolymer of claim 1, characterized in that, in the solvent system, based on per mole of magnesium halide, an amount of the organic epoxy compound is 0.6-2 moles; a mole ratio of the organic epoxy compound to the organic phosphorus compound is 0.9-1.4; an amount of the inert diluent is 1200-2400 ml.

10. The propylene-butene-1 random copolymer of claim 1, characterized in that the magnesium halide is selected from the group consisting of magnesium dihalide, complexes of magnesium dihalide with water or alcohol, and derivatives obtained by replacing one halogen atom in magnesium dihalide with a hydrocarbon group or a halohydrocarbyloxy group, and a mixture thereof.

11. The propylene-butene-1 random copolymer of claim 1, characterized in that the organic epoxy compound is selected from the group consisting of ethylene oxide, propylene oxide, butylene oxide, butadiene oxide, butadiene dioxide, epichlorohydrin, methyl glycidyl ether, diglycidyl ether, tetrahydrofuran, and a mixture thereof.

12. The propylene-butene-1 random copolymer of claim 1, characterized in that the organic phosphorus compound is selected from the group consisting of trimethyl ortho-phosphate, triethyl ortho-phosphate, tributyl ortho-phosphate, triphenyl ortho-phosphate, trimethyl phosphite, triethyl phosphite, tributyl phosphite, benzyl phosphite, and a mixture thereof.

13. The propylene-butene-1 random copolymer of claim 8, characterized in that the precipitating agent is selected from the group consisting of acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, methyl ether, ethyl ether, propyl ether, butyl ether, amyl ether, and a mixture thereof.

14. The propylene-butene-1 random copolymer of claim 1, characterized in that the polybasic carboxylic acid ester is selected from the group consisting of diethyl malonate, dibutyl malonate, diethyl adipate, dibutyl adipate, diethyl sebacate, dibutyl sebacate, diisobutyl phthalate, di-n-butyl phthalate, diisooctyl phthalate, diethyl maleate, di-n-butyl maleate, diethyl naphthalene dicarboxylate, dibutyl naphthalene dicarboxylate, triethyl trimellitate, tributyl trimellitate, triethyl hemimellitate, tributyl hemimellitate, tetraethyl pyromellitate, and tetrabutyl pyromellitate.

15. The propylene-butene-1 random copolymer of claim 8, characterized in that the titanium halide or derivatives thereof is selected from the group consisting of titanium tetrachloride, titanium tetrabromide, titanium tetraiodide, tetrabutoxy titanium, tetraethoxy titanium, monochloro triethoxy titanium, dichloro diethoxy titanium, trichloro monoethoxy titanium, and a mixture thereof.

16. The propylene-butene-1 random copolymer of claim 1, characterized in that the component A is prepared by a method that comprises the following steps:
1) dissolving magnesium halide by stirring in the solvent system at a temperature of 0-100° C. to form a transparent homogeneous solution;
2) adding a titanium compound into the solution or adding the solution to a titanium compound, in the presence of a precipitating agent and at a temperature of −35-60° C., and further adding a polybasic carboxylic acid ester before or after the precipitation of a solid to thereby treat the precipitated solid so that the polybasic carboxylic acid ester is partially loaded on the solid;
3) heating the reaction mixture obtained in step (2) to a temperature of 60-110° C., and stirring for 10 minutes to 10 hours;
4) filtering the reaction mixture obtained in step (3) and washing the filtrate with toluene and hexane to obtain the catalyst component A.

17. The propylene-butene-1 random copolymer of claim 1, characterized in that the components A, B and C are subjected to prepolymerization.

18. The propylene-butene-1 random copolymer of claim 17, characterized in that the pre-complexation temperature is in a range of −10-60° C.

19. The propylene-butene-1 random copolymer of claim 18, characterized in that the pre-complexation temperature is in the range of 0-30° C.

20. The propylene-butene-1 random copolymer claim 17, characterized in that the pre-complexation time is 0.1-100 min.

21. The propylene-butene-1 random copolymer of claim 20, characterized in that the pre-complexation time is 1-30 min.

22. The propylene-butene-1 random copolymer of claim 1, characterized in that the copolymerization of propylene and butene-1 is carried out in a liquid phase loop reactor.

23. A method for preparing a propylene-butene-1 random copolymer of claim 1, comprising:
copolymerizing propylene and butene-1 by adjusting the amount of the co-monomer butene-1 added in the reactor, in the presence of a Ziegler-Natta catalyst comprising:
a main catalyst component A,
a co-catalyst component B and
an external electron donor component C, at a polymerization temperature and with an appropriate hydrogen content,
wherein the component A is a solid catalyst component comprising titanium and a polybasic carboxylic acid ester obtained by dissolving magnesium halide in a solvent system composed of an organic epoxy compound, an organic phosphorus compound and an inert diluent;
the component B is an alkyl aluminum compound having the general formula $AlR_nX_{3-n}$,
wherein R is hydrogen or a hydrocarbon group having 1 to 20 carbon atoms and X is halogen; and the component C is an organosilicon compound having the general formula $R_nSi(OR')_{4-n}$, where $0 \leq n \leq 3$, R and R' are the same or different alkyl groups, cycloalkyl groups, aryl groups or halogenated alkyl groups,
wherein the copolymer has a butene-1 content of 1-6 mol %, a relative dispersity of butene-1, as determined according to NMR method, of greater than 99.0%, and a molecular weight distribution index Mw/Mn, as measured according to GPC, of 3.8-6.

24. The method according to claim 23, wherein the three catalyst components A, B and C are subjected to pre-complexation and optional prepolymerization and then added to the reactor.

25. A propylene-butene-1 random copolymer composition, comprising the propylene-butene-1 random copolymer of claim 1 and 0.1-1 parts by weight of a nucleating agent, relative to 100 parts by weight of the propylene-butene-1 random copolymer.

26. The propylene-butene-1 random copolymer composition of claim 25, characterized in that the amount of the said nucleating agent is 0.2-0.4 parts by weight.

27. The propylene-butene-1 random copolymer composition of claim 26, characterized in that the nucleating agent is Millad 3988 nucleating agent, ADK NA-21 nucleating agent, or Millad NX8000 nucleating agent.

28. The propylene-butene-1 random copolymer composition of claim 26, characterized in that a sheet with a thickness of 1 mm formed from the composition by melt injection molding has a haze of less than 10%.

29. The propylene-butene-1 random copolymer composition of claim 28, wherein the haze is less than 8%.

30. The propylene-butene-1 random copolymer composition of claim 26, characterized in that the composition has a heat distortion temperature of greater than 95° C.

31. The propylene-butene-1 random copolymer composition of claim 30, wherein the heat distortion temperature is greater than 100° C.

32. The propylene-butene-1 random copolymer composition of claim 30, wherein the heat distortion temperature is greater than 105° C.

33. A method for preparing the propylene-butene-1 random copolymer composition of claim 26, comprising the step of melt blending the propylene-butene-1 random copolymer powder with a nucleating agent and optionally other additives.

34. A food packaging container, which is formed by the propylene-butene-1 random copolymer of claim 1.

35. A food packaging container, which is formed by the propylene-butene-1 random copolymer composition of claim 25.

* * * * *